US006890576B2

(12) United States Patent
Mehta et al.

(10) Patent No.: US 6,890,576 B2
(45) Date of Patent: May 10, 2005

(54) METHOD OF MANUFACTURING FROZEN DAIRY DESSERT

(76) Inventors: Niranjan Chhotalal Mehta, A-9, Sea Face Park, Bhulabhai Desai Road, Mumbai (IN), 400 026; Robert Paget, 3492 Diendorf-am-komp, Lower Austria (AT), A-3492

( * ) Notice: Subject to any disclaimer, the term of this patent is extended or adjusted under 35 U.S.C. 154(b) by 34 days.

(21) Appl. No.: 10/168,896

(22) PCT Filed: Dec. 21, 2000

(86) PCT No.: PCT/IN00/00132

§ 371 (c)(1), (2), (4) Date: Sep. 16, 2002

(87) PCT Pub. No.: WO01/47369

PCT Pub. Date: Jul. 5, 2001

(65) Prior Publication Data

US 2003/0096040 A1 May 22, 2003

(30) Foreign Application Priority Data

Dec. 23, 1999 (IN) ........................................ 951/BOM/99

(51) Int. Cl.⁷ .............................. A23G 9/00; A23G 9/02
(52) U.S. Cl. ........................ 426/565; 429/491; 429/583
(58) Field of Search ................................ 426/565, 583, 426/491, 41

(56) References Cited

U.S. PATENT DOCUMENTS

| | | | |
|---|---|---|---|
| 3,852,496 A | * | 12/1974 | Weetall et al. ................. 426/41 |
| 4,631,196 A | | 12/1986 | Zeller |
| 4,840,813 A | | 6/1989 | Greenberg et al. |
| 4,855,156 A | | 8/1989 | Singer et al. |
| 5,413,804 A | * | 5/1995 | Rhodes ........................ 426/583 |
| 5,547,697 A | | 8/1996 | Lipsch et al. |
| 6,096,870 A | * | 8/2000 | Mozaffar et al. ........... 530/366 |

FOREIGN PATENT DOCUMENTS

| | | |
|---|---|---|
| JP | 61-224939 | 10/1986 |
| WO | WO 92/20239 | 11/1992 |
| WO | WO 93/02567 | 2/1993 |
| WO | WO 00/16637 | 3/2000 |

OTHER PUBLICATIONS

Loewenstein M. et al. "Using cottage cheese whey fractions or their derivatives in ice cream." Food Product Development. 1975 Department of Dairy Science, University of Georgia, Athens, Georgia, USA, vol. 9, No. 9, pp. 91, 93–94, 96.

* cited by examiner

Primary Examiner—N. Bhat
(74) Attorney, Agent, or Firm—Merchant & Gould P.C.

(57) ABSTRACT

The invention describes the manufacture of a frozen dessert, akin to sorbet, but having the organoleptic properties of ice cream from cooled milk whey. The milk whey could contain desired amount of fat, ranging from little to no fat, depending upon the quality and caloric value of the end product desired. Suitable sweetening agents and binders are added to the whey, which is subjected to a process of simultaneous agitation, aeration and freezing, resulting in a frozen dessert with an over run.

12 Claims, No Drawings

METHOD OF MANUFACTURING FROZEN DAIRY DESSERT

FIELD OF INVENTION

The invention relation to a method of manufacturing a frozen dessert having the organoleptic properties of ice cream from milk whey.

BACKGROUND OF INVENTION

The invention describes a method of manufacturing low calorie frozen dessert with little or no fat content. Ice creams have been perennial favourites as desserts. The palate has grown accustomed to the richness, creaminess and taste of ice creams. Present day emphasis on a low-fat diet has caused health concious people to cut back on the fat and cream in ice cream, and hence the world over people are seeking techniques for making low calorie frozen desserts. One such low calorie frozen dessert is sorbet.

Normal sorbet is made out of water, fruit pulp and/or flavor along with appropriate emulsifiers and stabilizers. It is light, fresh tasting and fluffy when consumed fresh on site. The difficulty with normal sorbet is that it tends to melt quickly and, in cold storage, tends to collapse in to an icy mass, thus having a very limited shelf life.

The present invention describes for the first time a frozen dessert from milk whey which may be clarified or used as is, depending upon the extent of fat and smoothness desired in the end product. The frozen dessert, which is a kind of sorbet has the much desired low-fat and low calorie value and the lightness, fluffiness and fresh taste of sorbet, and is akin to ice cream in its creaminess, smoothness, appearance and mouth-feel. In addition, it has a reasonable shelf life.

Whey is the serum remaining after most of the casein and fat from the milk has been removed, but still contains lactose, minerals, dissolved fat and proteins, often referred to as whey proteins. Whey is a voluminous bi-product of the cheese making industry. The use of whey in the form of whey powder of various concentrations of proteins, fat and lactose has been known for some time in the manufacture of ice cream, especially as a cheaper substitute for milk or nonfat milk solids. However the commercial cost of manufacturing whey powder is quite high, which adds to the final cost of ice cream made using whey powders.

In U.S. Pat. No. 4,840,813, of 1989 a method of preparation of low-fat or non-fat frozen desserts using whey protein concentrates has been described. The multi-stage method described in this patent is both complex and elaborate.

In Canadian Patent WO 92/20239, the inventors have described a denatured whey protein product, which can be used in the production of dairy products especially ice cream. This method again is an expensive and complex process, which involves concentrating the heat treated whey.

In Canadian Patent No: WO/16637, the inventors have described the preparation of a whey product with extended shelf life, which could be a frozen beverage, made from defatted whey to which an adjuvant is added, and the adjuvant is usually a milk protein preparation.

In Japanese Patent No: 61 224939 A, the inventors have described a method of preparing ices by freeze-agitation and aeration of milk whey(full whey). Ices prepared from full whey tend to be very opaque and heavy, and with very little creamy quality.

In U.S. Pat. No. 5,547,697, the inventors have described a method of preparing a zero fat whipped dessert comprising of milksolids non-fat, whey solids or mixture thereof. The invention describes an emulsion prepared from wheysolids, or milksolids using water or water containing liquid including whey. Zerofat as used herein is intended to mean that no fat is intentionally added to the whipped cream frozen dessert product and the ingredients used are substantially fat free. It has however made exception to the presence of fat traces present in milk solids not fat and small of triglycerides present in the emulsifiers used.

Loewenstein et al, 1975 have described a process wherein neutralised clarified whey has been hydrolised prior to the concentration process. The neutralised clarified whey is obtained by addition of potassium hydroxide, which precipitates out the protein. No mention has been made as to whether the clarified whey so obtained still contains the dissoved and undissolved fat. Concentrating whey to obtain whey solids is an expensive process, involving high energy costs, which makes the end products using an emulsion of whey solids or addition of whey solids commercially unviable. Further the whey used in all known methods is whole whey which normally contains substantial amounts of dissolved and undissolved fat and protein.

The present invention describes for the first time the preparation of a frozen dessert more akin to sorbet, from liquid milk whey, wherein the undissolved fat has been removed and if desired, the whey is further suitably treated to remove the dissolved fat and proteins to obtain clarified whey.

Clarified whey is the serum after the dissolved fat and protein have been removed, leaving behind the minerals, lactose, all water soluble vitamins, inorganic nitrogen compounds, peptones and some polypeptides.

Sorbet made out of clarified whey instead of water thus has the positive characteristics of sorbet, while mitigating some of the limitation of normal sorbet. The physico chemical properties of whey, including its colloidal properties promote locking in of air and foaming and allow for sorbet made out of whey to have the smoothness without ice crystal formation, the lightness, the fluffiness and mouth-feel akin to ice cream, without the high calorie and fat of ice cream. Its slow melting and storage behaviour allows for longer shelf life of the sorbet-like product. This invention describes a simple, low cost method for producing an essentially fat-free frozen dessert using milk whey preferably, clarified milk whey.

SUMMARY

In its main aspect the invention relates to a cost effective method of making a frozen dessert having the organoleptic, properties of ice cream such as appearance, smoothness, creaminess, fluffiness and mouth-feel from cooled liquid milk whey from which the undissolved and most of the dissolved fat has been removed by suitable heat treatment. A suitable sweetening agent and binder are added to the whey, and this mixture is subjected to a continuous process of simultaneous agitation, aeration and freezing resulting in a frozen dessert with an over run. In another aspect of this invention, the liquid milk whey is subject to a suitable treatment for the removal of dissolved and undissolved fat and protein, so as to obtain liquid clarified whey before it is subjected to a continuous process of agitation, aeration and freezing resulting in an over run to obtain a frozen dessert mass which is creamy, fluffy and light. Preferably the whey is subject to acid-heat treatment, which results in the coagulation of fat and protein, and the coagulate is removed to obtain clarified whey. Preferably the pH is adjusted to the range of 6.2 to 6.6 with citric acid to facilitate coagulation.

In yet another aspect of this invention, the liquid milk whey is subjected to a process of ultrafilteration, and the residue of proteins and fats is removed to obtain liquid clarified whey Preferably, the whey irrespective of its fat and protien content, is pasteurised before it is further processed.

In yet another aspect of this invention lactase is added, prior to addition of sweetening agent, so that the lactose in the whey may be converted to glucose and galactose. This would reduce the extent of external sweetening agent to be added. In a further aspect of this invention, an emulsifier is added to the whey mix either by itself or along with fruit pulp and/or flavouring agents. In one other aspect of this invention, a small amount of coagulate is also added to the whey mix. In its final aspect, the invention describes a frozen dessert comprising essentially of liquid clarified whey obtained after suitable treatment of milk whey to remove dissolved fat and protien, to which requisite amounts of sweetening agent, binder, emulsifier, fruit pulp and/or flavouring agents are added.

DESCRIPTION

The invention can be better understood by the following description of the process. In its preferred embodiment, the invention describes a method of manufacturing a frozen dairy dessert, having the organoleptic properties of ice cream such a smoothness, creaminess, fluffiness and mouthfeel, from cooled liquid milk whey. Whey is a major bi-product in the cheese manufacturing industry, but for the purpose of this invention the manner of milk whey production is immaterial. The source of the milk whey, whether it is from sheep, goat, camel, cow or buffalo milk is not significant. The extent of fat in the whey used, could range from little to no fat, by removing the undissolved fat and/or the dissolved fat and protein, depending on the quality of the end product of the frozen dessert desired. Defatted whey (DFW) is obtained by heating the whey to about 70° C. when most of the dissolved fat is precipitated out, and the precipitate is removed. The defatted liquid whey is cooled to a temperature of 3° centigrade. A suitable sweetening agent and binder are added to the liquid milk whey. The binder helps to prevent disintegration of the frozen dessert mass when formed. The cooled mixture of liquid whey, sugar and binder is subject to a process of simultaneous agitation, aeration and freezing in an ice cream machine so as to obtain a frozen dessert mass with an overrun. The overrun obained ranges from 30% to 120% by volume of whey initially used.

TABLE I depicts the extent of over run, appearance and creaminess obtained when full whey (FW), Defatted whey (DFW) and Clarified whey (CLW), along with a sweetening agent and binder are subjected to a process of simultaneous agitation, aeration and freezing.

SORBET EXPERIMENTS: RESULTS OF TRIALS

Scale for overrun, appearance, creaminess: 1 to 3 (1 being best). For overrun: 1=30 to 35% overrun.

TABLE I

| NUMBER | BASE + binder + sugar | OVER RUN | APPEARANCE | CREAMINESS |
|---|---|---|---|---|
| 1 | Water | 2 | 3, firm translucent | 3 like a block |
| 2 | Full Whey | 1 | 2 Opaque | 1 heavy |
| 3 | De Fatted Whey | 1 | 1 Opaque | 1 - less heavy than (2) |
| 4 | Clarified Whey | 1 | 1 Opaque | 1 Creamy |

In another embodiment of this invention, the liquid milk whey is subjected to an acid heat treatment. The whey is heated to a temperature of 90° to 95° centigrade in a double walled vessel, with very gentle or no stirring until a residue of coagulated protein and fat is formed. Just before the coagulated residue is formed, at a temperature of about 90 C, the pH of the milk whey is adjusted to the range of 6.2 to 6.6, preferably with 6 ml of 50% solution of citric acid for every 10 L of whey, to facilitate complete coagulation of the dissolved and undissolved protein and fat in the milk whey.

The coagulation of fat occurs at about 70° C. to 80° C. and the coagulation of protein occurs at 90° to 95° C. The aforementioned residue, which is commonly referred to as ricotta is removed, with a sieve so as to obtain clarified whey.

The clarified whey is cooled to about 3° C., to which the sweetening agent and binder as mentioned above are added. For safety purposes the mixture of clarified whey, sugar and binder are pasteurised, and cooled to 3° C. before it is subject to a process of simultaneous agitation, aeration is and freezing for 4 minutes to obtain a creamy frozen mass with an overrun. Usually an over run of 40% to 120% by volume of clarified whey used is obtained.

In yet another embodiment of this invention, the milk whey is subject to ultra-filtration, to remove the whey protein and obtain a clear permeate of clarified whey.

In a commercially viable embodiment of this invention suitable sweeting agent like sugar, an emulsifier like Sofleen (06070, Mec 3 (water emulsifier E471; Sorbit); Via Cerro, 1347832, S.Andrea di S.Clemente, Italy), and a binder like Neutro (Guarkemmehl E 412, Fa PRE GEL, S.P.A, Comparoni64, Villa Gavassetto, 42029, Reggio Emilia, Italy) is added to the cooled clarified whey to form a dessert premix. The emulsifier enhances storage quality and shelf life. Depending upon the desired flavour, suitable flavoring agents or fruit pulp is also added to the dessert premix. Addition of fruit pulp like peach, or flavours like coffee or malaga results in an excessive over run, of over 110%. The approximate composition of the premix is as follows:

For every 3 liters of whey (Full whey, clarified whey or defatted whey:

sugar 750 g emulsifier 15 g binder 10 g

In yet another embodiment of this invention, lactase may be added to the clarified whey, so that the lactose in the clarified whey is converted to glucose and galactose. This would reduce the quantity of sweetening agent required to be added to the dessert premix by 50%. Preferably 1 g lactase is added to every 3 L of clarified whey and allowed to stand for about 6 hours for the lactose to be hydrolysed to glucose and galactose.

In yet another embodiment of this invention, a small amount of ricotta is added to the dessert premix.

TABLE II gives the description of the quality of the final product, when to the premix (whey+binder+sweetening agent), fruit pulp is added with or without addition of ricotta. No emulsifier is added.

TABLE II

Premix (Whey + sugar + binder) +/− fruit pulp +/− ricotta

| Number | Ingredients/Additives | Overrun | Appearance | Creaminess | Storage Properties | Observations |
|---|---|---|---|---|---|---|
| 1 | Water, binder, sugar, mangopulp, citric acid | 1 | 2, heavier than no. 14 | 2, less creamy than No. 14 | Loss of quality at −12° C. tends to form an ice block at −25° C. | Not very good result |
| 2 | CLW, binder, suar, mangopulp, citric acid | 1 | 1 | 1 | Forms crystals and a sandy mouthfeel on storage at 25° C. significant shrinkage | Good result when consumed fresh, but bad storage properties |
| 3 | Water, binder, sugar, no pulp | 2 | 3, firm | 3, like a block | | Bad result |
| 4 | CLW, binder, sugar no pulp | 1 | 1 | 1, creamy | | Surprisingly good result |
| 5 | CLW, binder, sugar, vanilla flavour | 1 | 1 | 1 | After 24 hours at −12° C. significant shrinkage | Not good taste (goat whey plus vanilla - metallic taste) |
| 6 | CLW, binder, sugar, malaga flavour | 1+ | 1+ | 1+ | 24 hours at −12° C. significant shrinkage | First day very good result, second day bad result |
| 7 | Water, binder, sugar, mangopulp, 200 g ricotta | 2 | 3 | 3, heavy with pieces of ricotta left | | Bad result, ricotta particles in spite of blending before adding |
| 8 | CLW, binder, sugar, mangopulp, 200 g ricotta | 1 | 3 | 3 | | Worst result |

TABLE III gives the description of the final product when to the premix, emulsifier and fruit pulp are added, with or without addition of ricotta.

Premix (Whey, binder, sugar) + emulsifier + mango pulp with or without ricotta.

| Number | Ingredients/Additives | Overrun | Appearance | Creaminess | Storage Properties | Observation |
|---|---|---|---|---|---|---|
| 1 | Water, plus 200 g ricotta | 1 | 2 heavy | 2 | | Little pieces of ricotta remain in icecream |
| 2 | CLW,, plus 200 g ricotta | 1 | 2, heavy | 2 | | Not a good result |
| 3 | CLW, plus 100 g ricotta (thoroughly blendedin whey) | 1 | 2 | 1 | 24 h at −12° C., no shrinkage | Ricotta forms clumpy structure while freezing |
| 4 | Water | 1 | 1 | 1 | 24 h at −12° C. no change, 1 week at −12° C. no shrinkage, but usual loss of quality, 1 month at −25° C. no change | Good quality sorbet |

TABLE III-continued gives the description of the final product when to the premix, emulsifier and fruit pulp are added, with or without addition of ricotta.

Premix (Whey, binder, sugar) + emulsifier + mango pulp with or without ricotta.

| Number | Ingredients/ Additives | Overrun | Appearance | Creaminess | Storage Properties | Observation |
|---|---|---|---|---|---|---|
| 5 | CLW | 1 | 1 | 1+ | 24 h at −12° C. no change, 4 weeks at 25° C. good result | Best result of the experiments whey sorbet shows better structure and porosity than water sorbet after 1 week storage at −12° C. Seems to have better melting properties too. |
| 6 | DFW | 1 | 1 | 1 | 24 h at −12° C. no change, 1 week at 25° C. no shrinkage | Second best result |
| 7 | FW | 1 | 1 | −1 | 24 h at −12° C. no change, 1 week at −25° C. no shrinkage | Not bad, but significantly heavier not as good as CLW |
| 8 | WP normal | 1 | Not so smooth | Less homogeneous | 24 h at −12° C. no change | Good flavour and colour, nice taste |
| 9 | WP reduced lactose | 1 | 1 | 1 | 24 h at −12° C. no change | Significantly uninteresting flavour |
| 10 | Milk (cow) | 1 | 1 | 1 | 24 h at −12° C. no change | Less fruit flavour and colour than water or whey, more creamy but not fresh tasting. |

Scale for overrun, appearance, creaminess: 1 to 3 (being best)

For over run 1=30 to 35% over run.

TABLE IV gives the description of the final product when to the premix, emulsifier and flavours are added.

| Number | Ingredients/ Additives | Overrun | Appearance | Creaminess | Storage Properties | Observations |
|---|---|---|---|---|---|---|
| 1 | CLW plus 1000 g blueberry pulp | 1 | 1 | +1 | 24 hours at −12° C. no change, 1 week at −25° C. no shrinkage | Very good result on day a1 and 24 h later, even at week later at −25° C. |
| 2 | CLW plus 1000 g peach pulp | +1 | Character of 'Softice' 'too fluffy | 'not creamy, but fluffy | 24 h at −12° C. shrinkage, loss of fluffiness; harder, compact structure | Pulp was not well blended, significant loss of quality, but fresh and fruity taste |

TABLE IV-continued gives the description of the final product when to the premix, emulsifier and flavours are added.

| Number | Ingredients/ Additives | Overrun | Appearance | Creaminess | Storage Properties | Observations |
|---|---|---|---|---|---|---|
| 3 | CLW plus 30 g nescafe, 60 g ground coffee | ++1 (over 100%) | 1 | +1 | 24 h at −12° C. drastic change crumbly, firm structure, bad result | Significant contrast of day 1 and 24 h later |
| 4 | CLW plus 90 g cocoa | 1 | 1 | Structure like butter | 24 h at −12° C. loss of creaminess firm structure just like normal chocolate icecream after 24 h | Very good taste, fat taste |
| 5 | CLW treated with lactase ½ sugar 350 g | 1 | 1 | 1 | | |

Scale for overrun, appearance, creaminess: 1 to 3 (being best).

For over run 1=30 to 35% over run

We claim:

1. A cost effective method of manufacturing frozen dessert having organoleptic properties of ice cream comprising:
   removing the undissolved fat and most of the dissolved fat from liquid milk whey by suitable heat treatment to obtain defatted liquid milk whey,
   adding a suitable sweetening agent and binder to the liquid milk whey, and
   agitating, aerating, and freezing the liquid milk whey to obtain a frozen dessert with an over run.

2. The method of claim 1, further comprising:
   subjecting the defatted liquid milk whey to acid heat treatment resulting in complete coagulation of dissolved and undissolved protein, together with remainder dissolved and undissolved fat present in the whey, and
   removing the coagulate so formed to obtain clarified liquid whey which is cooled before it is subjected to agitating, aerating, and freezing resulting in a frozen dessert with an over run.

3. The method of claim 2, further comprising:
   adjusting the pH of the clarified liquid whey to a range of 6.2 to 6.6, just prior to the point when coagulation of proteins and fat occurs.

4. The method of claim 3 wherein the pH is adjusted with citric acid.

5. The method of claim 1, further comprising:
   subjecting the defatted liquid milk whey to a process of ultrafilteration, and
   removing the residue of proteins and fats to obtain clarified whey.

6. The method of claim 4, further comprising:
   pasteurizing the clarified whey.

7. The method of claim 6, further comprising:
   adding lactase to the chilled clarified whey, prior to adding a suitable sweetening agent.

8. The method of claim 6, further comprising:
   adding an emulsifier to the clarified whey.

9. The method of claim 8, further comprising:
   adding fruit pulp to the chilled clarified whey.

10. The method of claim 8, further comprising:
    adding flavour to the chilled clarified whey.

11. The method of claim 8, wherein less than 5% by weight of the coagulate of proteins and fat obtained from the liquid milk whey is added to the clarified whey.

12. A low-fat dairy dessert having organoleptic properties of ice cream comprising: liquid clarified milk, obtained from liquid milk whey which has been suitably treated for removal of dissolved and undissolved protein and fat, emulsifier, binder, sweetening agent, and at least one selected from the group consisting of fruit pulp and flavouring agent.

* * * * *